(12) United States Patent
Leith

(10) Patent No.: US 6,314,643 B1
(45) Date of Patent: Nov. 13, 2001

(54) METHOD FOR MAKING A MULTI-PIECE CRANKSHAFT

(75) Inventor: Donald G. Leith, 7114 S. Elder Ct., West Bloomfield, MI (US) 38324

(73) Assignee: Donald G. Leith, West Bloomfield, MI (US)

(*) Notice: Subject to any disclaimer, the term of this patent is extended or adjusted under 35 U.S.C. 154(b) by 0 days.

(21) Appl. No.: 09/526,819

(22) Filed: Mar. 16, 2000

(51) Int. Cl.$^7$ ................ B23P 17/00; F16C 3/04
(52) U.S. Cl. ............ 29/888.08; 29/888.1; 29/6.01; 29/418; 74/598
(58) Field of Search ............ 29/888.08, 888.1, 29/6.01, 418; 74/15.63, 15.66, 837, 838, 598

(56) References Cited

U.S. PATENT DOCUMENTS

| | | | |
|---|---|---|---|
| 359,290 | * 3/1887 | Stanwood | 74/598 |
| 718,422 | * 1/1903 | Brophy | 29/888.08 |
| 2,364,109 | * 12/1944 | Taylor | 74/597 |
| 3,608,396 | * 9/1971 | Bentley | 74/598 |
| 4,191,238 | 3/1980 | Pichl | 164/100 |
| 4,265,388 | 5/1981 | Takahashi et al. | 228/135 |
| 4,319,498 | 3/1982 | McWhorter | 74/595 |
| 4,351,201 | * 9/1982 | Link | 85/598 |
| 4,382,390 | 5/1983 | Jordan | 74/567 |
| 4,406,590 | 9/1983 | Kessler | 417/360 |
| 4,493,226 | 1/1985 | Andrione et al. | 74/598 |
| 4,494,286 | 1/1985 | Kaufman | 29/156.5 A |
| 4,597,365 | 7/1986 | Madaffer | 123/90.6 |
| 4,641,546 | * 2/1987 | Mettler | 74/598 |
| 4,835,832 | 6/1989 | Arnold et al. | 29/523 |
| 4,838,116 | 6/1989 | Saito | 74/595 |
| 5,088,345 | 2/1992 | Kemmler et al. | 74/598 |
| 5,207,120 | 5/1993 | Arnold et al. | 74/595 |
| 5,293,684 | 3/1994 | Fry | 29/888.08 |
| 5,737,976 | * 4/1998 | Haman | 74/596 |
| 5,899,120 | * 5/1999 | Leith | 74/603 |
| 6,173,628 | * 1/2001 | Leith | 74/598 |

FOREIGN PATENT DOCUMENTS

| | | |
|---|---|---|
| 364 371 | 11/1922 | (DE) . |
| 422 828 | 12/1925 | (DE) . |
| 542 056 | 1/1932 | (DE) . |
| 663 563 | 8/1938 | (DE) . |
| 822 036 | 11/1951 | (DE) . |
| 891 641 | 10/1953 | (DE) . |
| 1 270 893 | 6/1968 | (DE) . |
| 0 530 890 A1 | 3/1993 | (EP) . |
| 763668 | 5/1934 | (FR) . |

* cited by examiner

*Primary Examiner*—S. Thomas Hughes
*Assistant Examiner*—Marc Jimenez
(74) *Attorney, Agent, or Firm*—Gifford, Krass, Groh, Sprinkle, Anderson & Citkowski, P.C.

(57) ABSTRACT

A method for making a multiple piece crankshaft from a shaft and a crankpin is disclosed. A notch is first machined on an intermediate section of the shaft such that the notch has a length slightly less than the length of the crankpin. Mating surfaces are then formed on the shaft at opposite ends of the notch. Thereafter, the crankpin is positioned on the mating surfaces on the shaft so that the crankpin is parallel to and spaced from an axis of the shaft. The ends of the crankpin are then secured to the mating surfaces formed on the crankshaft and a portion of the intermediate section of the shaft is then removed by machining. A counterweight is finally positioned over each end of the crankpin at its juncture with the main shaft and secured to the crankpin and shaft thereby forming the crankshaft. Alternatively, the crankpin is positioned on mating surfaces formed on the counterweights and fasteners then secure the crankpin, counterweights and main shaft together.

7 Claims, 4 Drawing Sheets

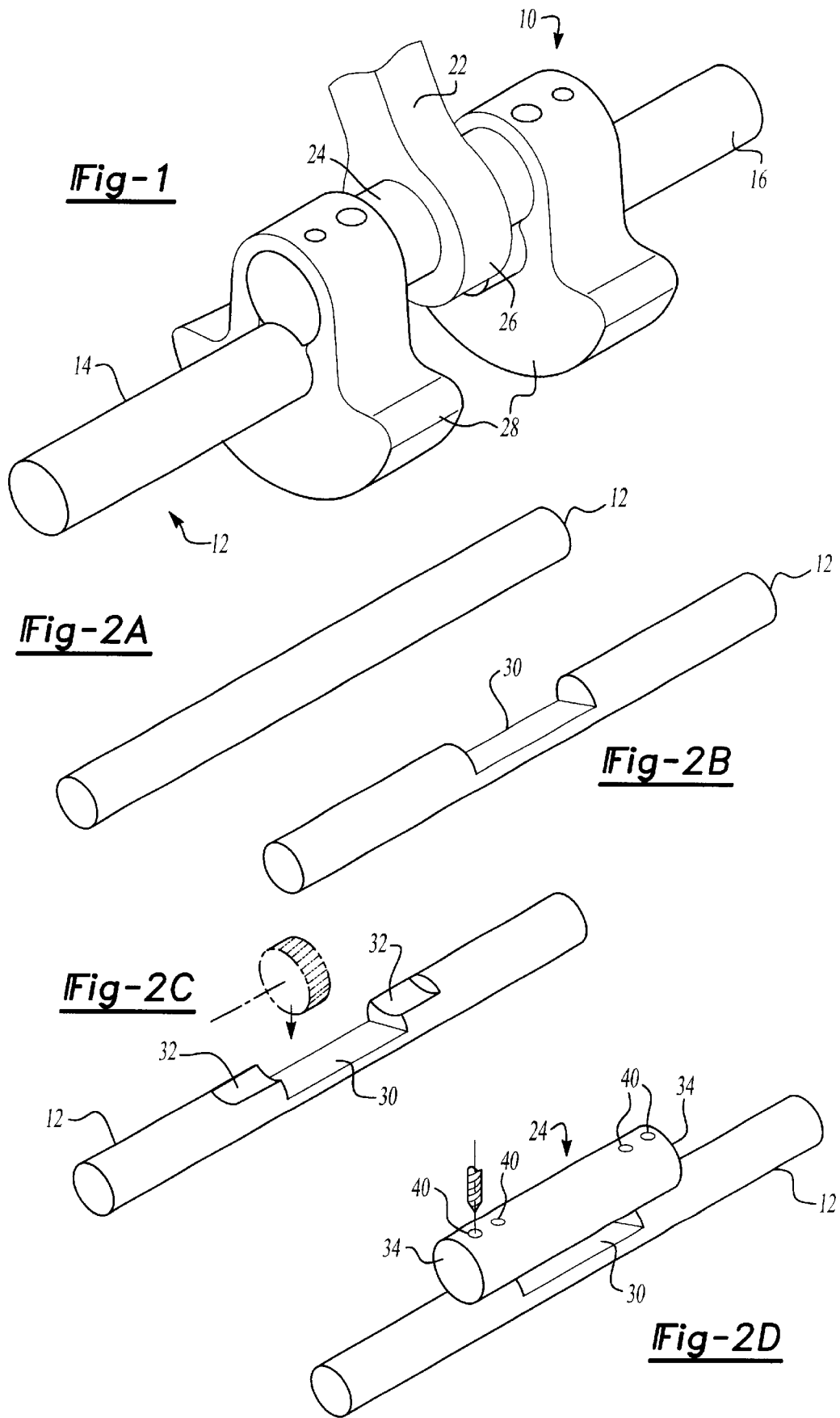

METHOD FOR MAKING A MULTI-PIECE CRANKSHAFT

BACKGROUND OF THE INVENTION

I. Field of the Invention

The present invention relates generally to crankshafts and, more particularly, to a method for making a multi-piece crankshaft.

II. Description of the Prior Art

Crankshafts of the type used in reciprocal piston engines and compressors typically comprise a main shaft having at least two axially aligned shaft sections with a crankpin extending between the facing ends of the shaft sections. The crankpin is oriented so that its axis is parallel to, but radially spaced from, the axis of the main shaft. Counterweights are then provided at the junction of each end of the crankpin with the main shaft thus forming the crankshaft.

There have been many different ways for manufacturing the previously known crankshafts. In one conventional method, the entire crankshaft is formed as a one-piece casting. After forming the casting, the casting is machined, typically by grinding, in order to form the crankshaft.

The previously known one-piece crankshafts, however, are disadvantageous in several different respects. One disadvantage of the previously known one-piece crankshafts is that the casting process and subsequent machining of the casting is a relatively expensive process requiring specialized and expensive equipment.

A still further disadvantage of the previously known one-piece crankshafts is that, since the crankshaft is formed from a one-piece casting, the entire casting must be made from the same material. This disadvantageously increases the overall material cost for the previously known one-piece crankshafts since the crankpins and main shaft must be constructed from a high strength steel while, conversely, it is unnecessary to construct the counterweights from a high strength material.

A still further disadvantage of the previously known one-piece crankshafts is that, in order to connect the piston rod to the crankpin, the connecting rod must necessarily utilize a split ring connector, i.e. two semi-circular shells which are secured together, typically by bolts. Such split ring connectors for the piston rods are necessarily more expensive than a single piece connector for a piston rod.

There have, however, been previously known crankshafts that are constructed from separate pieces, i.e. separate main shaft segments, separate counterweights and separate crankpins. Various methods, such as press fit splines, shaft deformation and the like, have been utilized by these previously known multi-piece crankshafts to mechanically connect the components of the crankshaft together.

Even though these previously known multi-piece crankshafts are suitable for many reciprocating piston applications, many crankshaft applications require that the various components of the crankshaft be oriented within very small manufacturing tolerances relative to each other. These tolerances include, inter alia, the concentricity between the segments of the main shaft, the parallelism of the axis of the crankpin to the axis of the main shaft, and also the radial spacing between the axis of the crankpin and the axis of the main shaft. As a practical matter, it has not been possible to manufacture these multi-piece crankshafts with the small manufacturing tolerances required by certain applications on a consistent and cost effective basis. In particular, it is extremely difficult to maintain the concentricity of the segments of the main shaft during the attachment of the counterweights and crankpin. Likewise, it has proven impractical to maintain the parallelism between the axis of the crankpin and the main shaft where small manufacturing tolerances are required.

SUMMARY OF THE PRESENT INVENTION

The present invention provides a method for manufacturing a multi-piece crankshaft which overcomes all of the above-mentioned disadvantages of the previously known multi-piece crankshafts.

In brief, in the present invention, a notch is first removed at an intermediate section of an elongated shaft which ultimately will form the shaft segments of the main shaft. The longitudinal length of the notch is less than the length of the crankpin and mating surfaces for the crankpin are machined in the main shaft or alternatively in counterweights mounted to the main shaft at opposite ends of the notch. Furthermore, the depth of the notch is sufficient so that, with the crankpin positioned with its opposite ends on the mating surfaces on the crankshaft and with a bearing of a piston connecting rod positioned around the crankpin, a clearance is provided between the connecting rod bearing and the notch. However, since the main shaft is still of a one-piece construction, the concentricity between the ends of the main shaft is ensured.

After the crankpin is positioned against the mating surfaces machined on the main shaft, the ends of the crankpin are connected to the main shaft by any conventional means. However, in the preferred embodiment, one or more holes are formed radially through each end of the crankpin and into the crankshaft. Fasteners, such as a bolt, rivet, dowel or the like, are then inserted through the radial holes, thereby securing the ends of the crankpin to the main shaft.

After the crankpin is connected to the main shaft, a portion of the main shaft between the ends of the crankpin is then removed thus dividing the main shaft into two coaxially aligned shaft segments. The length of the removed portion of the main shaft, furthermore, is sufficient to allow rotation of the crankshaft with the attached connecting rod.

Thereafter, in one embodiment of the invention counterweights, which may be constructed of an inexpensive material, are positioned around each end of the crankpin at its junction with the main shaft. These counterweights are then secured to the crankpin and main shaft in any conventional fashion thereby completing the crankshaft.

Although preferably the portion of the main shaft between the ends of the crankpin is removed prior to attaching the counterweights around the ends of the crankpin and the main shaft, the counterweights may alternatively be secured to the crankpins and main shaft prior to removing the portion of the main shaft between the ends of the crankpin.

BREIF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a perspective view illustrating a preferred embodiment of the present invention;

FIGS. 2A–2G are diagrammatic views illustrating the steps of manufacture of the crankshaft of the present invention;

DETAILED DESCRIPTION OF A PREFERRED EMBODIMENTS OF THE PRESENT INVENTION

Figure 3:
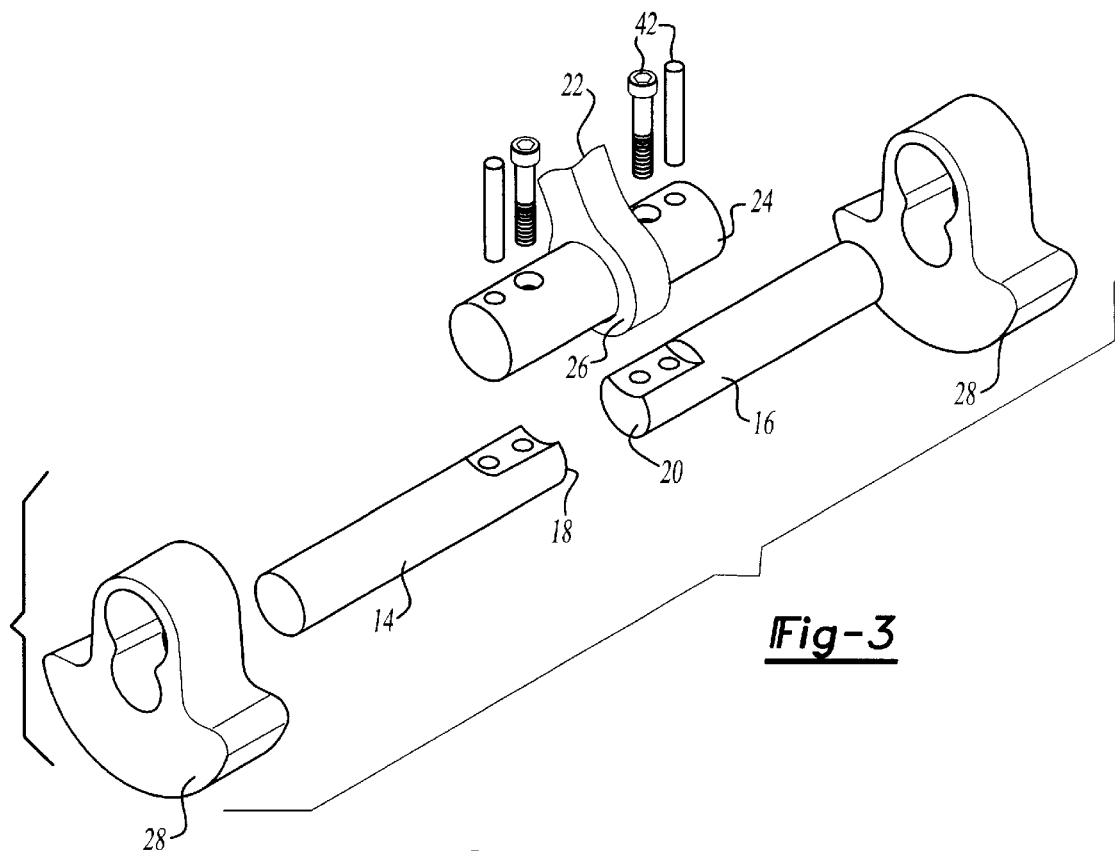
FIG. 3 is an exploded view of a finished crankshaft of the present invention.

With reference first to FIG. 1, a completed crankshaft 10 constructed by the method of the present invention is illustrated in FIG. 1. The crankshaft 10 includes a main shaft 12 having two or more axially aligned main shaft segments 14 and 16. Each main shaft segment 14 and 16, furthermore, has two facing ends 18 and 20 (FIG. 3). These facing ends 18 and 20 of the main shaft segments 14 and 16, respectively, are axially spaced apart from each other by a distance sufficient to allow a connecting rod 22 to pass between the ends 18 and 20 of the main shaft segments 16 and 14.

Still referring to FIG. 1, a crankpin 24 extends across the ends 18 and 20 of the main shaft segments 14 and 16, respectively, and is secured to the shaft segments 14 and 16 in a manner to be subsequently described in greater detail. The axis of the crankpin 24 is parallel to but radially spaced from the axis of the shaft segments 14 and 16. Furthermore, the piston connecting rod 22 includes a bearing 26 disposed around the crankpin 24 and, preferably, this bearing 26 is of a one-piece construction.

Lastly, the crankshaft 10 includes a pair of counterweights 28 with one counterweight 28 positioned around each end of the crankpin 24 at its junction with the shaft segment 14 or 16.

With reference now to FIGS. 2A–2G, the method of manufacturing the crankshaft 10 will now be described. At FIG. 2B, a notch 30 is first removed from an intermediate section of the main shaft 12. This notch 30 extends for a longitudinal distance slightly less than the overall length of the crankpin 24 for a reason to be subsequently described. Any conventional machining operation, such as milling, can be utilized to form the notch 30. Furthermore, the notch 30 has a depth sufficient to provide a clearance between the main shaft 12 and the connecting rod bearing 26 (FIG. 1) but still leaving a sufficient amount of the main shaft 12 to maintain the opposite ends of the main shaft 12 coaxial with each other.

With reference now to FIGS. 2C and 2D, following the formation of the notch 30, a mating surface 32 is machined at each end of the notch 30 so that the mating surface 32 has a complementary shape with the opposite ends 34 of the crankpin 24. In the preferred embodiment, the mating surfaces 32 are semi-circular in shape having the same diameter as the diameter of the cylindrical crankpin 24. Optionally, however, a mating surface of a different shape, for example a flat mating surface, may be formed at both ends 34 of the crankpin 24, in which case the mating surfaces 32 would also be flat.

Figure 2E:
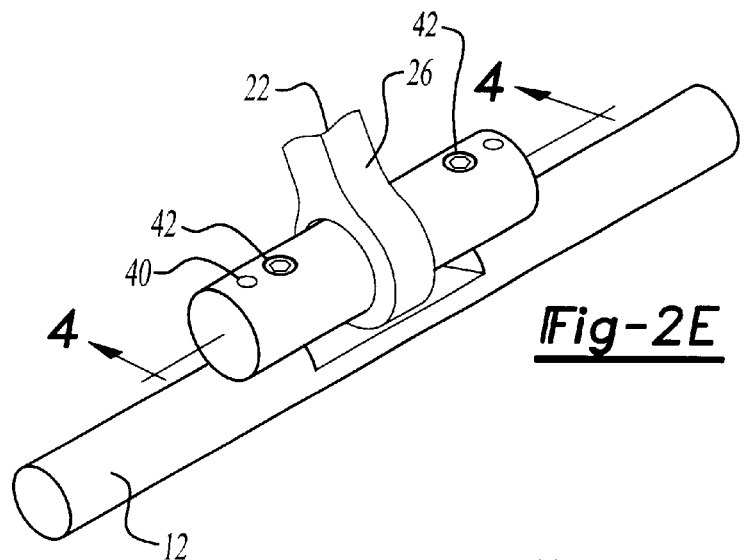
Figure 4:
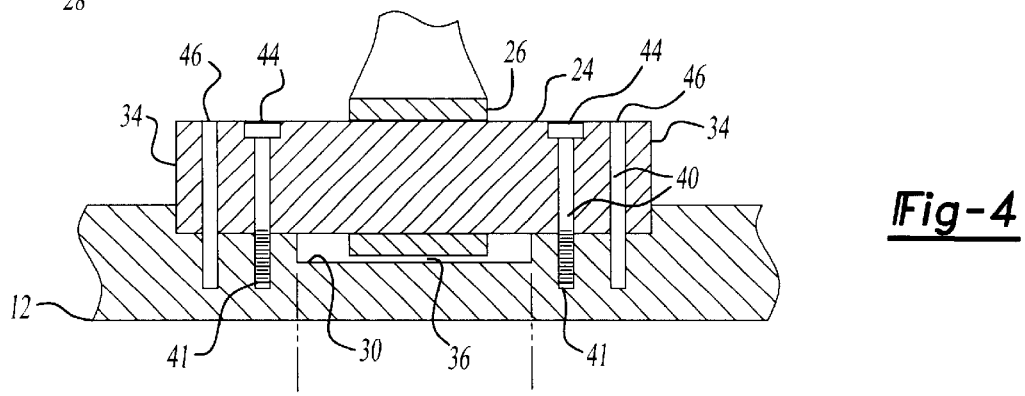
FIG. 4 is a view taken substantially along line 4—4 in FIG. 2G.

With reference now to FIGS. 2D, 2E and 4, the crankpin 24 is then positioned on the main shaft 12 so that the ends 34 of the crankpin flatly abut against the mating surfaces 32 on the main shaft 12. Preferably, the bearing 26 for the piston rod 22 is positioned around the crankpin 24 prior to positioning the crankpin 24 on the main shaft 12. In doing so, a clearance space 36 (FIG. 4) is provided between the bottom of the connecting rod bearing 26 and the bottom of the notch 30.

As best shown in FIG. 2D, after the crankpin 24 is positioned on the main shaft 12, at least one, and preferably two holes 40 are drilled in each end 34 of the crankpin 24. These holes 40, furthermore, extend diametrically through the crankpin 24 and terminate inside the main shaft 12. Preferably, in one embodiment internal threads 41 (FIG. 4) are formed within the main shaft 12 for at least one hole 40 at each end 34 of the crankpin 24.

As shown in FIGS. 2E and 4, after forming the holes 40, fasteners 42, such as a bolt 44 and dowel 46, are utilized to secure each end 34 of the crankpin 24 to the main shaft 12. Although preferably two fasteners 42 are utilized at each end 34 of the crankpin 24, it will be understood that the crankpin 24 may be secured to the main shaft 12 by other means such as gluing, welding, or the like. Likewise, although one of the fasteners 42 is preferably a threaded fastener, alternatively one or both fasteners can be press fit. In this latter case internal threads would not be formed in the holes 40.

Figure 2F:
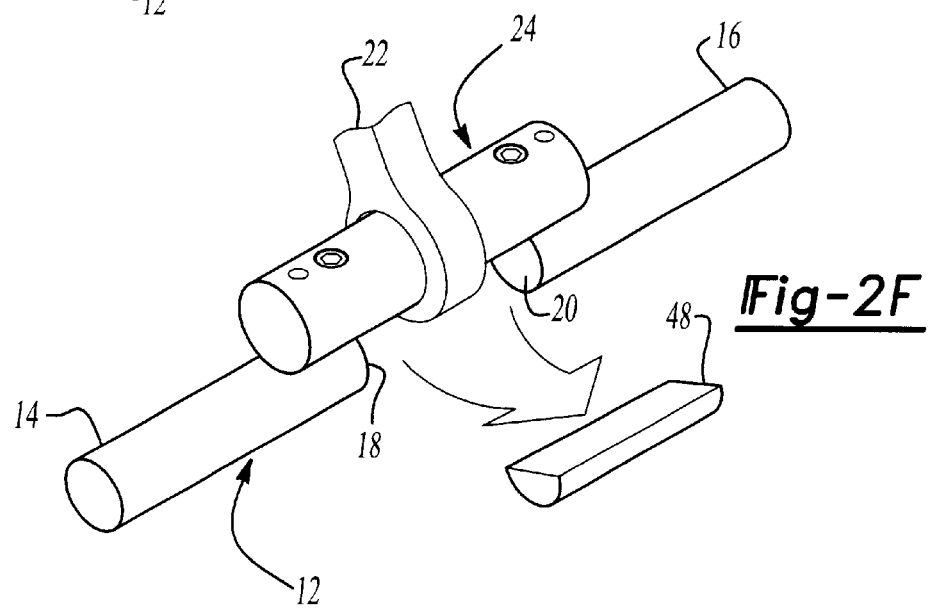

With reference now to FIG. 2F, after the crankpin 24 is secured to the main shaft 12, a portion 48 of the intermediate section of the shaft 12 between the ends 34 of the crankpin 24 is removed from the main shaft 12 by any conventional machining operation thus forming the two coaxially aligned shaft segments 14 and 16. The longitudinal length of the removed portion 48 is substantially the same or slightly less than the longitudinal length of the notch 30. In any event, the longitudinal length of the removed portion 48 is sufficient to allow the piston connecting rod 22 and its bearing 26 to pass between the facing ends 18 and 20 of the main shaft segments 16 and 14, respectively.

Figure 2G:
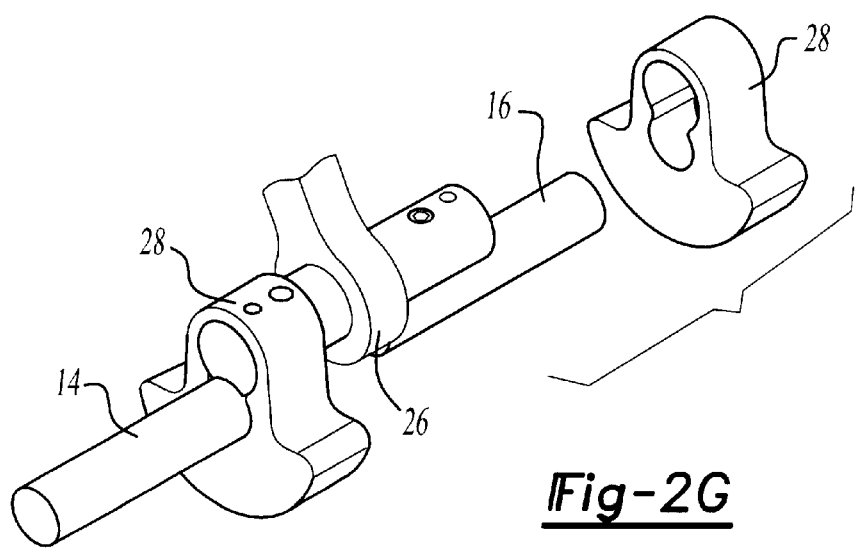
Figure 5:
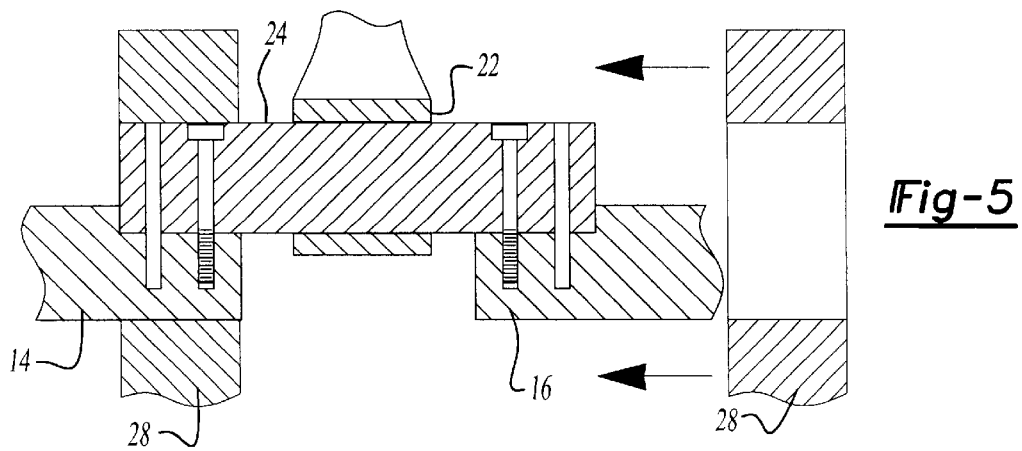
FIG. 5 is a fragmentary longitudinal sectional view corresponding to FIG. 2G.

With reference now to FIGS. 2G and 5, after the portion 48 is removed from the main shaft 12, one counterweight 28 is positioned over each end 34 of the crankpin 24 such that the counterweight 28 extends around both the crankpin end 34 and the end 18 or 20 of the shaft segments 14 and 16. The counterweights 28 are preferably secured to the crankpin 24 and shaft segments 14 and 16 by a press fit although any other means, such as glue, welding or the like, may alternatively be used. After attachment of the counterweights 28 to the crankpin 24 and shaft segments 14 and 16, the manufacture of the crankshaft 10 is complete. It will be understood, of course, that other machining operations may optionally be performed on the ends of the crankshaft 10 depending upon its particular application.

Figure 6A:
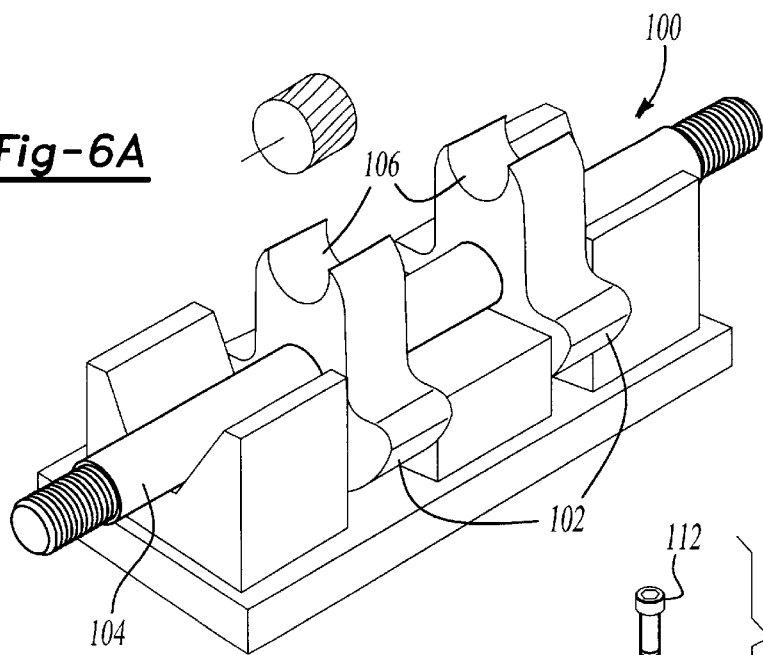
FIGS. 6A–6C are perspective views illustrating a second preferred embodiment of the invention.

With reference now to FIG. 6A, a further preferred embodiment of a crankshaft 100 is there shown in which counterweights 102 are positioned on a main shaft 104 so that the counterweights are spaced apart and parallel to each other. A mating surface 106 is then machined on each counterweight 102 such that the counterweight mating surface is complementary to a mating surface 108 on opposite ends of a crankpin 110. Consequently, with the ends of crankpin 110 positioned on the counterweight mating surfaces 106, parallelism and radial spacing between the main shaft 104 and crankpin 110 is obtained with high precision.

Figure 6B:
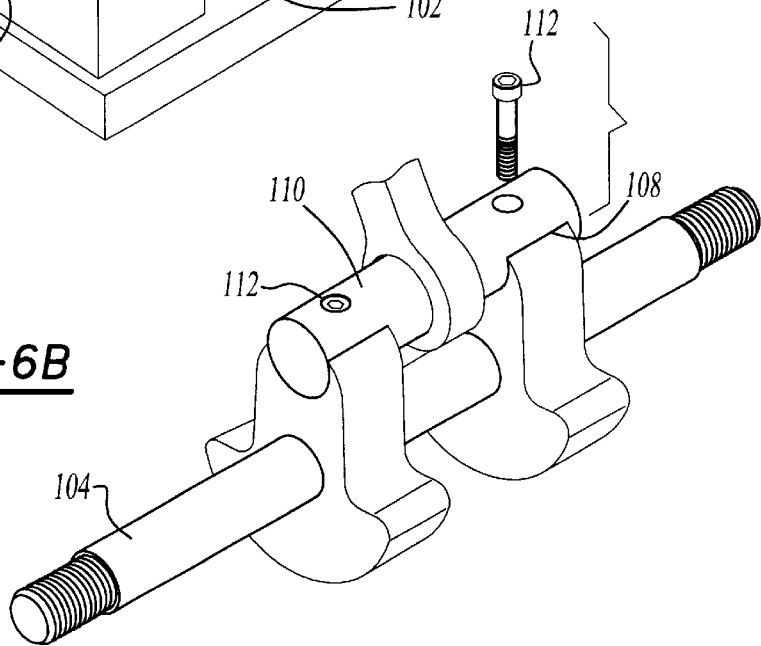

As shown in FIG. 6B, after positioning the crankpin 110 on the counterweights 102, at least one diametric hole is formed through each end of the crankpin 110, through a portion of the counterweight 102 and radially into the main shaft 104. A fastener 112, such as a bolt, is then positioned through the holes at each end of the crankpin and into the main shaft 104 thus securing the crankpin 110, main shaft 104 and counterweights 102 together. Optionally, two or more fasteners provided through each end of the crankpin 110 or other fastening means, such as glue, can be used.

Figure 6C:
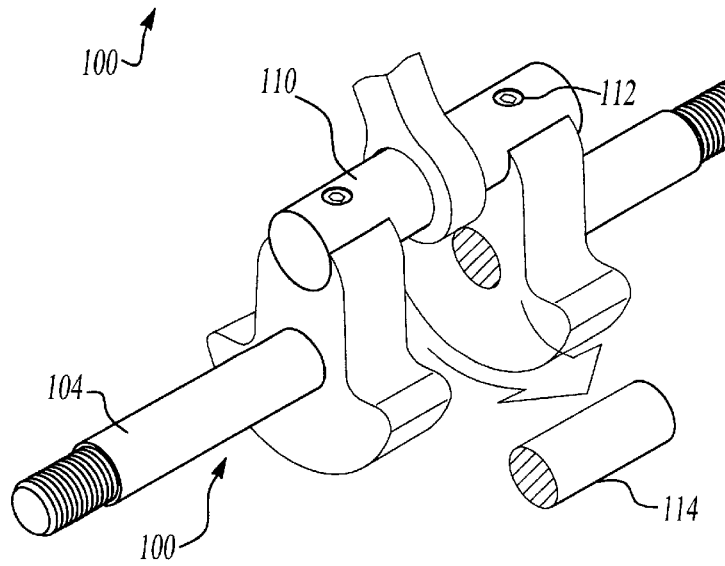

With reference now to FIG. 6C, after the crankpin 110, counterweights 102 and main shaft 104 are secured together, a portion 114 of the main shaft 104 between the counterweights 102 is removed to permit rotation of the crankshaft 100 with its attached piston rod.

A primary advantage of the crankshaft 110 illustrated in FIGS. 6A–6C is that a circumferentially extending portion of the counterweight around the crankpin is removed. This reduces the weight of the counterweights 102 thus reducing material costs and improving engine efficiency.

From the foregoing, it can be seen that the method of manufacturing the crankshaft 10 of the present invention provides a simple yet highly effective method for manufacturing a multi-piece crankshaft in which very small tolerances may be maintained during the manufacturing process. The primary reason that the method of the present invention is able to achieve very small tolerances is that the main shaft is maintained as a single piece until after the crankpin is secured to the main shaft. As such, concentricity of the ends of the main shaft following the removal of the shaft portion 48 is essentially ensured.

Although a specific embodiment of the present invention has been described in great detail, no undue limitation should be inferred therefrom. For example, in the preferred embodiment of the invention, the cross-sectional plane of the crankpin overlaid the cross-sectional plane of the main shaft so that it was necessary to machine the notch 30 from the main shaft 12 in order to provide clearance not only for the crankpin 24 but also its attached connecting rod 22. In other applications, the cross-sectional plane of the crankpin may not overlap the cross-sectional plane of the main shaft 12. In that case, it would be necessary to provide a pair of spaced bosses on the main shaft 12 spaced apart by the axial length of the crankpin and then to secure the crankpin to those bosses.

Having described my invention, however, many modifications thereto will become apparent to those skilled in the art to which it pertains without deviation from the spirit of the invention as defined by the scope of the appended claims.

I claim:

1. A method for making a multi-piece crankshaft from a shaft and a crankpin having two ends comprising the steps of:

positioning the crankpin on an intermediate section of the shaft so that an axis of the crankpin is parallel to and spaced from an axis of the shaft;

securing both ends of the crankpin to the shaft;

removing a portion of said intermediate section of the shaft thereby forming two disconnected and axially aligned shaft segments from the shaft, forming at least one hole diametrically through each end of the crankpin and radially into a portion of the shaft, securing a fastener in each said hole so that the fastener extends diametrically through the crankpin and radially into the portion of the shaft, and thereafter securing a counterweight around each end of the crankpin so that said counterweights extend around both the crankpin and the shaft segments.

2. The invention as defined in claim 1 and further comprising the step of forming a notch in said intermediate portion of the shaft prior to positioning the crankpin on the shaft.

3. The invention as defined in claim 2 and further comprising the step of machining a mating surface in the shaft at each end of said notch, each mating surface being shaped to flatly abut against one of said ends of the crankpin.

4. The invention as defined in claim 1 wherein said fastener is a threaded fastener.

5. The invention as defined in claim 1 and comprising the step of forming at least two radially extending holes in each end of the crankpin, each hole adapted to receive a fastener.

6. The invention as defined in claim 5 wherein said fastener comprises a dowel.

7. The invention as defined in claim 1 and further comprising the step of placing a one-piece bearing of a piston rod around the crankpin prior to said securing step.

\* \* \* \* \*